Oct. 11, 1960   O. E. BALJE ET AL   2,955,656
AUXILIARY POWER SYSTEM FOR AIRCRAFT
Filed Dec. 27, 1954   3 Sheets-Sheet 1
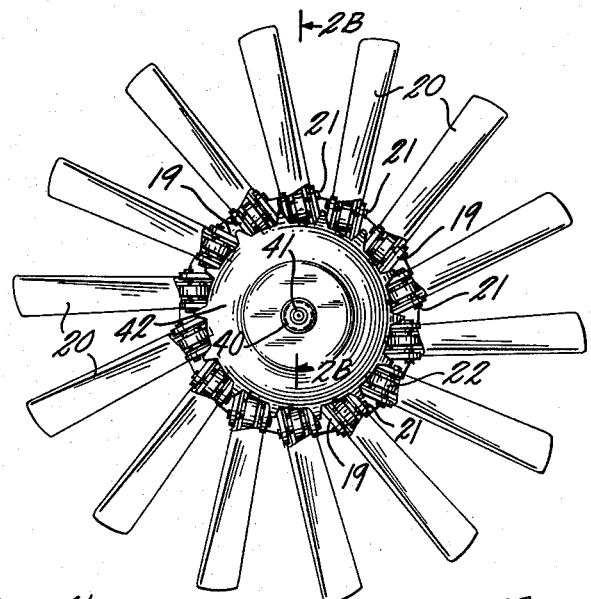
FIG. I.
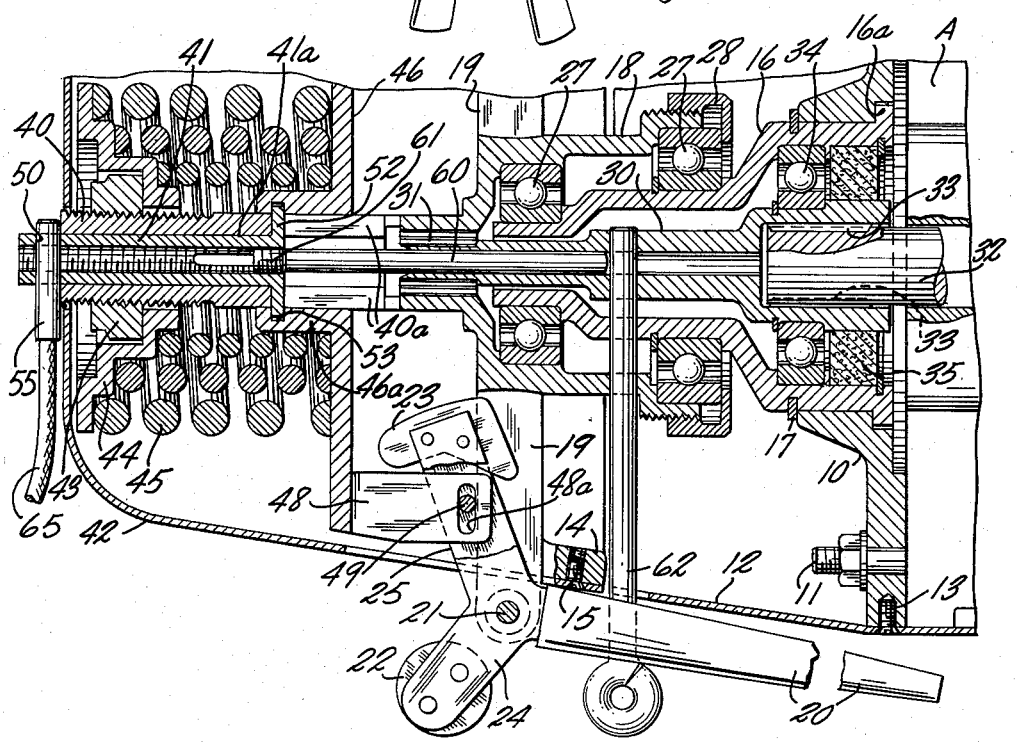
FIG. 2A.
INVENTORS.
OTTO E. BALJE &
JOHN J. DINEEN
BY
Campbell, Brumbaugh, Free & Graves
Their ATTORNEYS Oct. 11, 1960 O. E. BALJE ET AL 2,955,656
AUXILIARY POWER SYSTEM FOR AIRCRAFT
Filed Dec. 27, 1954 3 Sheets-Sheet 2
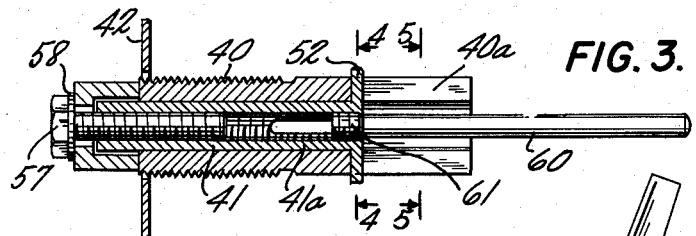
FIG. 3.
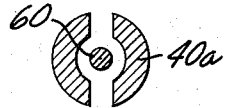
FIG. 4.
FIG. 5.
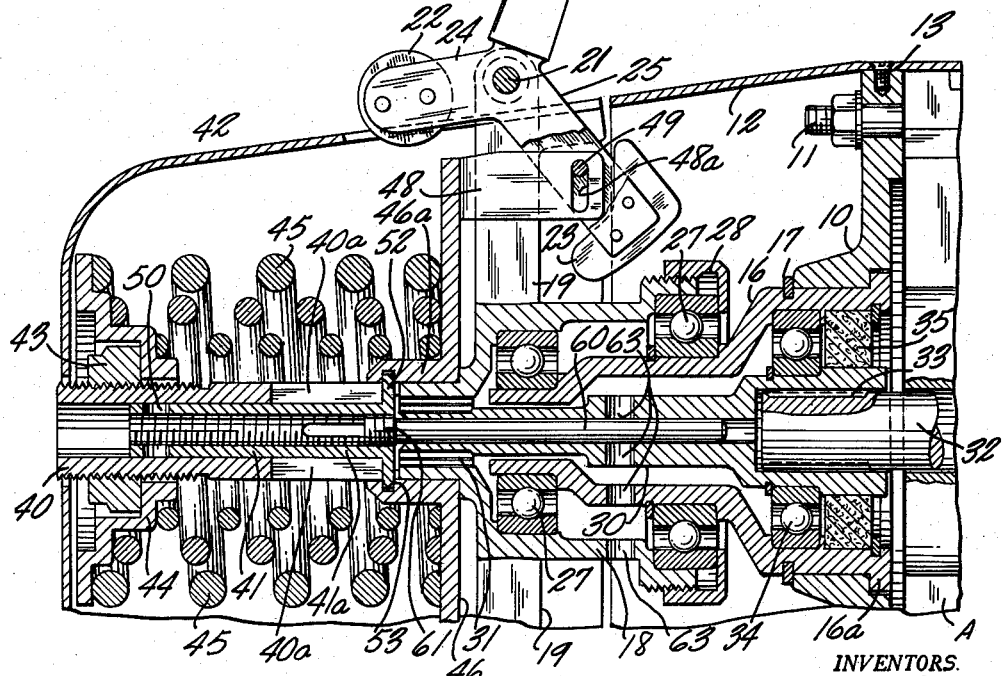
FIG. 2B.
INVENTORS.
OTTO E. BALJE &
JOHN J. DINEEN
BY
Their ATTORNEYS.

Oct. 11, 1960 O. E. BALJE ET AL 2,955,656
AUXILIARY POWER SYSTEM FOR AIRCRAFT
Filed Dec. 27, 1954 3 Sheets-Sheet 3

INVENTORS.
OTTO E. BALJE &
JOHN J. DINEEN
BY
Campbell, Brumbaugh, Free & Granka
Their ATTORNEYS

United States Patent Office 2,955,656
Patented Oct. 11, 1960

2,955,656

AUXILIARY POWER SYSTEM FOR AIRCRAFT

Otto E. Balje, Hollywood, Calif., and John J. Dineen, East Northport, N.Y., assignors to Fairchild Engine and Airplane Corporation, Long Island City, N.Y., a corporation of Maryland Filed Dec. 27, 1954, Ser. No. 477,766

9 Claims. (Cl. 170—74)

This invention relates to turbines generally, and more specifically to a turbine designed to provide a relatively constant power output over an appreciably wide range of pressures or velocities of the impelling fluid.

The turbine of the present invention has been especially designed as a source of power for auxiliary equipment of aircraft, and this particular application will be stressed in the description of the invention. However, the turbine of the present invention has a general application, and there is no intention to limit it to any particular form or use.

There is certain auxiliary equipment on airplanes that is most important to its proper safe operation; one such example is the hydraulic landing gear system which operates normally on power supplied by the main propulsion engines. A failure of the main propulsion engines leaves the airplane without a source of power for such equipment at a time when the safety of the airplane is most dependent upon the proper functioning of said equipment. Here, there is a definite need in aircraft for a source of power for said auxiliary equipment that is entirely independent of the main propulsion engines.

The principal object of the present invention, therefore, is to provide a turbine capable of using the free air stream as the impelling fluid current for imparting rotation to the turbine rotor, and which, in addition, is capable of supplying the necessary power requirements to the various auxiliary equipment of aircraft regardless of the speed of the airplane or the relative velocity of the airstream to the airplane. Most aircraft equipment requires a steady, continuous power supply for proper operation and the power requirements are usually the same whether the plane be traveling at gliding speed or at top cruising speed. It is, of course, evident that the power available to the turbine from the free air stream is much greater when the plane is traveling at higher speeds than when it is traveling at lower speeds. The turbine of the present invention is designed to compensate for variations in the velocity or pressure of the impelling air stream in relation to the turbine in order to enable the turbine to maintain a relatively constant power output.

The present invention provides a power turbine which will not only meet the above-stated requirements, but embodies many other special features and advantages as well. The turbine comprises a driven rotor equipped with a plurality of balanced adjustable blades or vanes which are adapted to present a variable frontal area to the current of the impelling fluid or air stream, the frontal area diminishing as the pressure of the impelling fluid against the blades increases, and increasing as the pressure of the impelling fluid or air stream against the blades decreases. Since the rotational speed of the turbine rotor is a function of both the pressure of the impelling fluid against the blades and the frontal area of the blades, it is evident that a compensating effect may be achieved if the frontal area presented by the blades is varied inversely with the pressure of the impelling fluid. This compensating effect may be advantageously employed to maintain a governed, relatively constant speed of the turbine which is fairly independent of the speed of the airplane or the velocity of the plane in relation to the velocity of the air stream.

The frontal area presented by the blades to the air stream may be varied by mounting the blades pivotally so that they may be adjusted between extreme extended or outspread positions substantially normal to the axis of rotation of the turbine rotor and extreme retracted positions substantially parallel to the axis or rotation of the turbine rotor. The frontal area presented by the outspread or extended blades is, of course, much greater than that presented by the blades in their retracted positions. In addition, the blades are equipped with heavy balancing weights to prevent them from being unduly sensitive to sudden variations or changes in relative wind speed or other unimportant temporary influences, and the weights also act as a centrifugal governor against excessive speeds. The pressure exerted upon the adjustable blades by the air stream is counteracted by a spring pressure, that is to say, the spring pressure urges the blades to the outspread positions, whereas the pressure of the air stream upon the blades is such as to urge them in the opposite direction to their retracted positions. It will thus be seen that the forces involved in the positioning of the blades to vary their frontal area and, therefore, the power absorbed by the blades, can be determined by the strength of the spring, the pressure exerted upon the blades by the air stream, the predetermined shape and mass of the blades, and the masses and relative locations of the balancing weights. The design of the present turbine is such as to utilize the variability of the frontal area presented by the blades to achieve a turbine driven by the free air stream at relatively constant speed and power output.

Other advantages and features of the present turbine are that it is small and compact so that it may be easily stored in the body of an airplane, that it may be readily mounted for operation or dismantled and stored when not in use and, further, that it is adapted to be locked easily in a safety condition and to be released readily and quickly into an operating position.

These and other features and advantages of the present invention will be apparent and understood from the following detailed description of the invention given herein, and by reference to the accompanying drawings, in which:

Figure 1 is a front elevation of the present turbine depicting the blades in the extended positions;

Figs. 2A and 2B are side cross-section views of the turbine, the Figure 2A illustrating the blades in the retracted positions and having the upper portion of the turbine broken away, and the Fig. 2B view illustrating the blades in the extended positions and having the lower portion of the turbine broken away; the Fig. 2B taken approximately along the line 2B—2B of Fig. 1, looking in the direction of the arrows;

Fig. 3 is an enlarged cross-section view of certain parts shown in Figs. 2A and 2B, and including an alternative embodiment for locking the blades in the retracted positions;

Fig. 4 is a cross-section view taken along the line 4—4 of Fig. 3, looking in the direction of the arrows;

Fig. 5 is a view taken along the line 5—5 of Fig. 3, looking in the direction of the arrows.

Figure 6B:
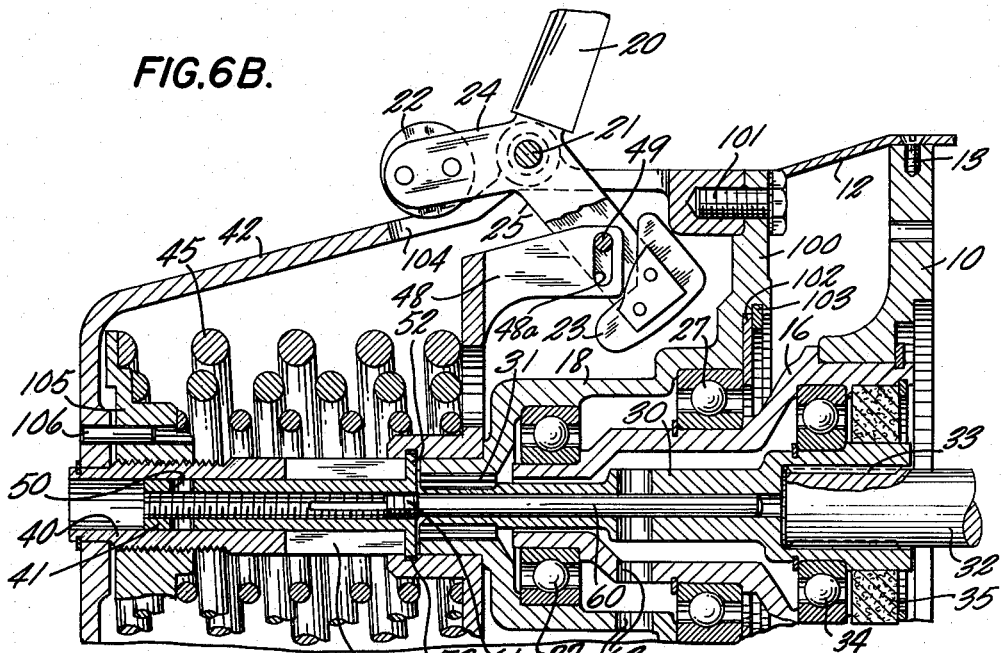
Figs. 6A and 6B are views similar to Figs. 2A and 2B, respectively, but illustrating an alternative embodiment of the invention.

Referring to the drawings, and particularly to Figs. 1, 2A and 2B, the turbine of the present invention is attached to the front end of a frame, generally designated by the reference character A, of the equipment desired to be driven, such as a hydraulic pump or an air pump or an electric generator, by means of the annular base mounting 10, which is attached to the said frame A by the bolts 11. A circular housing or cover 12 is secured at one end to the outside of the annular base member 10 by means of screws 13. A progressively tapered hollow hub or spindle 16 extends through a hole formed in the base mounting 10. The base or widest diameter end of the hollow hub 16 is provided with an outwardly projecting rim 16a which is adapted to seat within a circular accommodating recess formed in the base of the annular mounting 10, and the hub 16 is further secured to the mounting 10 by snap rings 17.

The hollow hub 16 is formed with a plurality of outside surfaces of progressively increasing diameters, and the hub 16 serves as a support and internal bearing for a rotor 18 and as a support and external bearing for a rotatable shaft 30 which connects the rotor with the shaft 32 of the driven equipment A. The rotor 18 comprises a central, generally cylindrical core provided with a plurality of radially disposed spokes 19 extending therefrom. The outer ends of the spokes 19 carry the balanced blades or vanes 20 pivotally mounted on shafts 21 thereof. The forward portion of the turbine is enclosed by a rotatable housing 42 which is secured to the flanges 14 formed integrally with the spokes 19 by the screws 15. The blades are balanced by two weights 22 and 23 adjustably positioned on the arms 24, 25, respectively. The rotor 18 is adapted to be driven by the thrust imparted to the blades 20 by the impelling air stream, and the rotor 18 rotates at one end of the hub 16 upon the ball bearings 27. The right end of the rotor 18, as viewed in the drawings, carries a companion collar 28 threaded thereon to maintain the rotor 18 securely upon the hub or spindle 16. The thrust of the air current upon the blades 20, of course, has a tendency to thrust the rotor 18 to the right, as viewed in the drawings. However, this thrust is resisted by the tapered shape of the hub.

While the rotor 18 rotates coaxially upon the hollow hub, a central shaft or core 30 is connected to and driven by the rotor 18 by means of a spline connection 31. The spline connection 31 occurs at the forward end of the rotor 18 and the core 30 in front of the extreme tapered end of the hub or spindle 16, and as previously mentioned, the rear end of the core 30 is connected to the drive shaft 32 of the driven equipment A by another spline connection 33. In this regard, it may be pointed out that the configuration of the core 30 is, like the hub 16, progressively tapered toward the front, and the rear end, having the widest diameter, is provided with a recess which accommodates the shaft 32 of the driven equipment. The core 30 also is provided with a central axial boring to accommodate a slidable rod 60, the function of which will be described below. The rotatable shaft or core 30 rotates coaxially within the stationary hollow hub or spindle 16 on conventional ball bearings 34 with conventional oil seals 35.

At this point it should be understood that the turbine, driven by the free air stream, is adapted to be mounted outboard of an airplane and that the thrust thereby imparted to the blades 20 causes them to rotate. The blades 20, being connected to the rotor 18 through the radial spokes 19, causes the rotor 18 to rotate, and as explained, the rotor 18 is mechanically connected by means of the spline connection 31, the core shaft 30 and the spline connection 33 to the drive shaft 32 of the mechanism A.

Turning now to the manner in which the blades 20 are pivotally adjusted to present a variable frontal area to the impelling fluid on air current, two concentric and generally cylindrical sleeves 40 and 41 (see Figs. 2A, 2B and 3) are housed in the nose of the turbine, that is to say, that portion of the turbine enclosed by the forward rotatable casing 42. The inner sleeve 41 slides within the outer sleeve 40, and the rear end of the sleeve 41 is split to form two prongs 41a (see Fig. 3). The very ends of the prongs are provided with outstanding lugs 52 which engage notches 53 in a hub portion 46a of a plate or disc 46. The outer sleeve 40 is threaded at the forward end on its outside surface, and this end of the sleeve 40 is adapted to carry a nut 43 thereon. The nut 43 serves as an adjustment for an annular spring confining member 44, the member 44 abutting the inside face of the nut 43. The opposite or rear end of the sleeve 40 is smooth, but it is slotted to form two prongs 40a (see Figs. 3, 4 and 5), and the outwardly projecting lugs 52 of the inner sleeve 41 are slidably accommodated in these slots. The prongs 40a are embedded in the forward end of the rotor 18, and the sleeve 40 rotates therewith.

The sleeve 40 carries the compression spring 45 thereon, the compression spring engaging at its forward end the spring confining member 44, and at its rear end a circular plate 46. The circular plate 46 is formed with a hub or bearing portion 46a which seats upon and is longitudinally movable upon the outer surface of the end of the sleeve 40 and the outer surface of the forward end of the rotor 18.

As shown in Figs. 2A and 2B, the back surface of the circular plate or disc 46 is provided with a plurality of rearwardly extending plates or tags 48, and these plates 48 are provided with vertical slots 48a to accommodate pins 49 which project from the arms 25 of the blades.

From the foregoing description, it is evident that the action of the spring 45 against the circular plate 46 is such as to always urge the plate in a rearward direction to maintain the blades 20 in the outwardly extended position. The connection between the circular plate 46 and the arms 25 of the blades will cause the blades to be moved to their extended positions when the plate 46 is to be moved in a rearward direction. Thus, increases in the unbalanced centrifugal forces generated by selecting weights 22, 23 to give a desired unbalanced effect and the selection of a spring 45 of the desired pressure will result in the blades 20 assuming an adjusted position under average air stream currents to present the necessary frontal area to the air stream so that the desired rotational speed will be imparted to the shaft 32. It is apparent that increases in the velocity of the air stream current, which would otherwise increase the rotational speed imparted to the shaft 32, will cause the blades to retract against the compressive force of the spring 45, reducing the frontal area presented by the blades, and thereby having a compensating effect to prevent the increase in the rotational speed imparted to the shaft 32. Also, decreases in the velocity of the impelling air current will cause an unbalance which will allow the spring 45 to expand, thereby pivoting the blades 20 to a further outspread or extended position to increase the frontal area presented by the blades. Thus, the forces involved in the positioning of the blades 20 relative to the axis of the turbine to vary the frontal area of the blades, and therefore the power absorbed by the blades to compensate for deviations from the average expected force of the air stream upon the blades is determined, among other factors, by the strength of the spring 45, the adjustment of the nut 43, the masses of weights 22, 23 and their positions relative to the pivots 21, and by the predetermined shape and mass of the blades 20.

In operation, the action of the centrifugal force on the counterbalancing weights 22 and 23 causes the weights to have a stabilizing influence on the position of the impeller blades due to the fact that their centers of gravity are disposed on opposite sides of the pivot for the impeller blades. However, when the blades are retracted beyond a certain angle (see Fig. 2A), the centers of gravity are on the same side of the pivot of the impeller blades so that the effect of centrifugal force on the weights is to urge the blades to retracted positions.

The turbine may or may not be permanently anchored to the equipment A to be driven, and it may or may not be in continuous operation. However, in its application as an emergency source of power in airplanes, it would not be in permanent use and it would be desirable to keep the turbine housed out of the airplane slip stream. This may be accomplished by mounting the turbine and the driven equipment on a frame that may be swung into the slip stream of the airplane, or out of the air stream and into a storage compartment of the airplane. As the details of construction to accomplish this may be conventional and constitute no part of the present invention, it is not necessary to set forth such details herein.

If the turbine is to be normally carried in a storage compartment of the airplane, to save space it is preferable that it be placed therein with the blades in the folded back or retracted positions. The present invention includes three embodiments for maintaining and locking the blades 20 in their retracted positions. In one such embodiment, the inner sleeve 41 which slides within the outer sleeve 40 is provided with a hole 50 (see Figs. 2A and 2B) near its forward end. As mentioned above, the rear end of the inner sleeve 41 is split into prongs 41a, and the very ends of the prongs are provided with outstanding lugs 52, which are adapted to engage notches 53 formed in the internal periphery of the hub 46a. The blades 20 may be forced manually into their retracted positions, thereby sliding the hub portion 46a and the inner sleeve 41 in a forward direction until the hole 50 of the sleeve 41 is translated beyond and in front of the forward end of the outer sleeve 40, at which position a pin 55 may be inserted in the hole 50. The length of the pin 55 is greater than the diameter of the outer sleeve 40, and hence, it maintains the inner sleeve in its forward position against the action of the spring 45 to lock the blades in their retracted or folded back positions.

The second provision for locking the blades 20 in their retracted positions for storage comprises a threaded bolt 57 (see Fig. 3) that is adapted to be inserted through a hollow washer or collar 58 into the front end of the sleeve 41. The collar 58 fits against the front edge of the sleeve 41, and the collar may be used to support or mount the front end of the turbine for ground storage. The external threads of the bolt 57 engage the internal threads of the sleeve 41, and the rotation of the bolt 57 in one direction takes up on the inner sleeve 41 and moves the sleeve and the disc 46 in a forward direction, thereby compressing the spring 45 and pivoting the blades 20 to their retracted positions.

The third manner of locking the blades 20 in their retracted positions when the turbine is not in use includes the long rod 60 threaded at its forward end as at 61 to engage the internal threads of the split rear end of the inner sleeve 41, and a long pin 62 (see Fig. 2A) which extends through accommodating holes 63 in the housing 12, the rotor 18, the hub or spindle 16, and the internal rotatable core 30. The pin 62 is represented in Fig. 2A as being inserted through the bottom of the turbine. However, the pin 62 preferably is intended to be inserted from the top so that it may be maintained therein by gravity. The representation in Fig. 2A, therefore, is purely illustrative.

As shown in Fig. 2B, the rear end of the rod 60 normally extends beyond the holes 63 which accommodate the pin 62. However, when the sleeve 41 is moved to its forward-most position, as when the blades 20 are manually moved to their retracted positions, the rear end of the rod just clears the accommodating holes 63, so that the pin 62 may be inserted therein. When the pin 62 is in place, the sleeve 41 cannot move to the rear because of the engagement by the rear end of the rod 60 with the pin.

It is, of course, apparent, as mentioned above, that one or more of these embodiments for locking the blades in their retracted positions can be used in a single embodiment of the invention. When only the first embodiment is employed to lock the blades in their retracted positions, the pin 55 is fastened to a lanyard 65 (see Fig. 2A), the other end of which is attached to a part of the airplane. When not in use, the turbine is mounted on a frame and swung into its storage compartment (the pin 55 being inserted in the accommodating hole 50). When the use of the turbine is desired, the turbine is swung out into the air slip stream, the lanyard 65 withdrawing the pin 50 to permit the blades to move to their outwardly extended positions.

The turbine may be assembled initially to the equipment 9 to be driven in the following manner. The spindle or hub 16 is secured to the annular base mounting 10, and the rotor 18, with its spokes 19 and blade assembly is mounted on the hub 16 with the ball bearings 27 in place. The interial shaft or core 30 is then inserted from the rear until its spline connection 31 is made and the rear of the shaft is supported in the bearings 34.

The control system is then assembled by bending together the split rear ends 41a of the inner sleeve, so that the lugs 52 may slip into the notches 53 in the hub portion 46a of the disc or plate 46. The forward end of the rod 60 is then screwed into the rear end of the inner sleeve 41, and the rearward end of the rod is inserted into the center of the inner shaft 30. The outer sleeve 40 may then be slipped over the inner sleeve 41 until the rear prongs 40a thereof enter the accommodating holes in the forward end of the rotor 18. The spring 45 may be seated upon the outer sleeve 40 with its rear end against the plate or disc 46 and the spring-confining member 44 positioned against the forward end of the spring, whereupon the nut 43 is screwed up on the sleeve 40 against the front of the spring to obtain proper compression of the spring. The rear housing 12 is fastened to the annular mounting 10 by the screws 13, and the forward housing 42 is secured to the spokes 19. If the blades of the turbine are to be locked back in their retracted positions to permit storage of the turbine, the pin 62 may be inserted in the holes 63 and/or the pin 55 inserted in the hole 50, or the bolt 57 inserted in the inner sleeve 41 and tightened up. It is to be noted that the pin 62 will also engage the inner shaft 30 locking it against rotation.

Figure 6A:
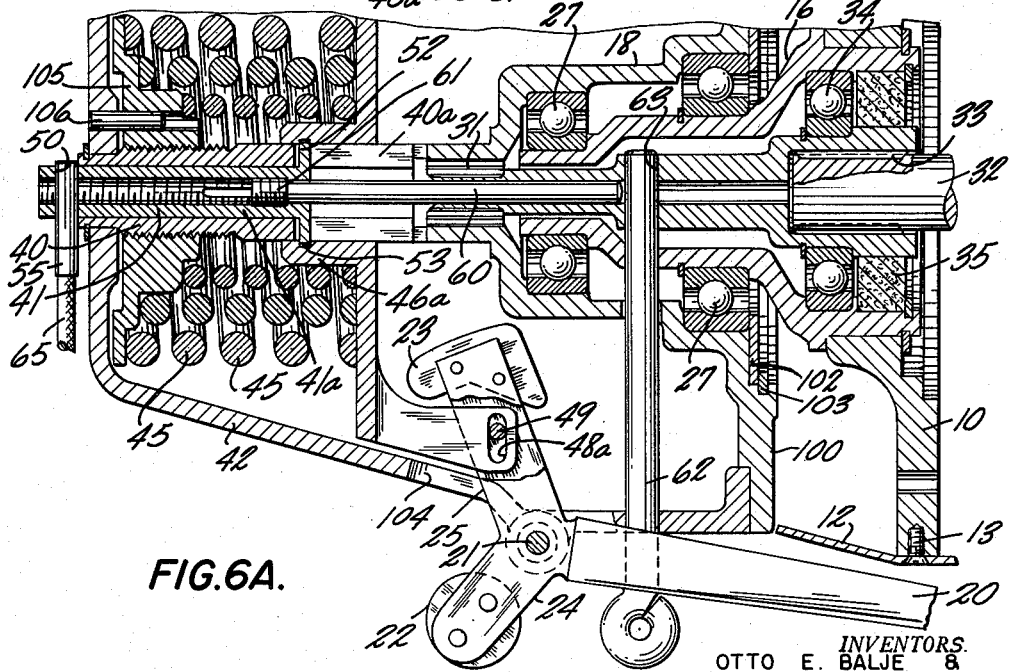

Figs. 6A and 6B depict an alternative embodiment of the present turbine. In this embodiment, like the embodiment shown in Figs. 1 to 5, the progressively tapered hub or spindle 16 is mounted within the annular disc 10, and the rotor 18 rotatably supported on the hub or spindle 16 by the ball bearings 27. The discs 102 and the snap rings 103 maintain the rotor securely upon the hub, taking the place of the collar 28 in the embodiment described above. As in the embodiment described above, the rotor is connected to the drive shaft 32 of the equipment to be driven by the core or shaft 30 rotatably mounted within the hub or spindle by the ball bearings 34. The rear housing 12 is mounted to the outside of the mounting 10 by the screws 13, all in the manner above described.

Unlike the previous embodiment, the spokes 100 are formed integrally with the rotor 18. The forward rotatable shell or housing 42 is mounted to the spokes 100, and the shell proper carries the pivots 21 for the blades 20. Thus, the shell or housing 42, in the embodiment shown in Figs. 6A and 6B, is heavier and stronger than the forward housing in the previous embodiment. The shell may be joined to the radial spokes 100 by the screws 101 (see Fig. 6B). The arms 24, 25 of the blades 20 carry the weights 22, 23, and the shell or housing 42 is provided with slots 104 to permit the pivotal movement of the blades.

The spring 45 is carried, as usual, upon the sleeve 40, and the rear end of the spring acts against the plate or disc 46. However, the spring-confining member 105 which engages the front end of the compression spring is threadably adjusted upon the sleeve 40. The member 105 is held in rotational association with the housing 42 by means of pins 106. Except as above described, the parts and the manner of operation of the turbine shown in Figs. 6A and 6B are generally similar to the embodiment previously described in connection with Figs. 1 to 5.

The invention has been shown and described in preferred forms and by way of example only, and it is obvious that many modifications and variations may be made therein without departing from the spirit of the invention. For example, the turbine need not necessarily be applied to airplanes, and the impelling fluid need not be a free air stream. It is to be understood, therefore, that the invention is not to be limited to any particular form or embodiment, except in so far as such limitations are specified in the claims.

We claim:

1. A turbine driven by an impelling fluid comprising a rotor, a plurality of blades, means mounting said blades for adjustment from positions substantially radial to the axis of rotation of the rotor to retracted positions in which the outer ends of the blades are folded back toward the axis of rotation of the rotor, thereby presenting a variable frontal area normal to the impelling fluid, the pressure of the impelling fluid urging the blades to adjusted positions of reduced frontal area normal to the impelling fluid, means urging the blades to adjusted positions of increased frontal area normal to the impelling fluid to balance the pressure exerted by the impelling fluid under regular operating conditions, and a pair of counterweights for controlling the pivotal operation of said blades, the action of the centrifugal force on the counterweights stabilizing the position of the blades when the blades are extended to present a frontal area exceeding a predetermined value, but the action of the centrifugal force on both counterweights urging the blades to retracted position when the blades are retracted to present a frontal area less than a predetermined value.

2. A turbine comprising a rotor, a plurality of blades pivotally mounted thereto, said blades being movable together from an extended position to a retracted position, thereby presenting a variable frontal area normal to the impelling fluid, the pressure of the impelling fluid normally urging the blades toward a retracted position, an outer sleeve mounted to the rotor, an inner sleeve slidably mounted within the outer sleeve, a member movably mounted on the outer sleeve and being connected to the inner sleeve through slots in the outer sleeve, said movable member being connected to each of said pivotal blades, a spring mounted on said outer sleeve and normally urging the movable member in a direction to pivot the blades to their extended position, and a spring-confining member adjustably mounted on said outer sleeve to engage the other end of the spring, the pressure of the impelling fluid normally urging the blades toward a retracted position, the spring pressure normally urging the blades to an extended position, and the arrangement being such that the blades are balanced intermediate the extreme extended and retracted positions under regular operating conditions.

3. A turbine comprising a rotor, a plurality of blades pivotally mounted thereto, said blades being movable together from an extended position to a retracted position, thereby presenting a variable frontal area normal to the impelling fluid, the pressure of the impelling fluid normally urging the blades toward a retracted position, an outer sleeve mounted to the rotor, an inner sleeve slidably mounted within the outer sleeve, a member movably mounted on the outer sleeve and being connected to the inner sleeve through slots in the outer sleeve, said movable member being connected to each of said pivotal blades, a spring mounted on said outer sleeve and normally urging the movable member in a direction to pivot the blades to their extended position, a spring-confining member adjustably mounted on said outer sleeve to engage the other end of the spring, the pressure of the impelling fluid normally urging the blades toward a retracted position, the spring pressure normally urging the blades to an extended position, and means for locking the inner sleeve in a forwardly position to maintain the blades retracted for purposes of storage.

4. A combination as set forth in claim 3, including a hole formed in one end of the inner sleeve, said hole projecting beyond the outer sleeve when the blades are in the retracted position, and a pin adapted to be inserted in said hole to lock the inner sleeve in such position to maintain the blades retracted.

5. A combination as set forth in claim 3, wherein an end of the inner sleeve is internally threaded and including a bolt adapted to be threadably engaged to the inner sleeve to lock the inner sleeve in such position to maintain the blades retracted.

6. A combination as set forth in claim 3, including an elongated rod threadably connected to the inner sleeve, a hole formed in the turbine, said rod normally extending across said hole, the rod being free of said hole when the blades are in the retracted position, and a pin adapted to be inserted within said hole to maintain the blades retracted.

7. A turbine driven by an impelling fluid comprising a rotor, a support bearing for said rotor, a plurality of blades pivotally mounted to said rotor from an outspread position to a retracted position, thereby presenting a variable frontal area normal to the impelling fluid, an element movable relative to the support bearing and axially of said rotor, means connecting said movable element and the blades so that the position of said element determines the position of said blades and the variable frontal area presented thereby, spring means urging the blades to adjusted positions of increased frontal area, and a detachable locking element which acts on the movable element in opposition to said spring means to fix the movable element in the axial position necessary to maintain the blades in retracted positions and at the same time on the rotor and the support bearing to lock the rotor against rotation relative to the support bearing.

8. A turbine as set forth in claim 7 in which the detachable locking element is a locking pin which engages a part connected to the movable element and including aligned holes in the rotor and support bearing to receive the locking pin.

9. A turbine as set forth in claim 7 in which the detachable locking element is threadably coupled to an end of the movable element.

References Cited in the file of this patent

UNITED STATES PATENTS

| | | |
|---|---|---|
| 1,481,024 | Porter | Jan. 11, 1924 |
| 1,558,645 | Terhorst | Oct. 27, 1925 |
| 2,220,514 | D'Aubarede | Nov. 5, 1940 |
| 2,516,576 | Jacobs | July 25, 1950 |
| 2,533,785 | Fumagalli | Dec. 12, 1950 |
| 2,727,577 | DeMuth | Dec. 20, 1955 |
| 2,777,524 | Chapman et al. | Jan. 15, 1957 |